United States Patent [19]
Otsuki

[11] Patent Number: 5,315,398
[45] Date of Patent: May 24, 1994

[54] AUTOMATICALLY ADJUSTABLE SHEET MEMBER CUTTING DEVICE

[75] Inventor: Shinnichiro Otsuki, Kawaskai, Japan

[73] Assignee: Canon Kabushiki Kaisha, Tokyo, Japan

[21] Appl. No.: 86,372

[22] Filed: Jul. 6, 1993

Related U.S. Application Data

[63] Continuation of Ser. No. 781,573, Oct. 23, 1991, abandoned.

[30] Foreign Application Priority Data

Oct. 24, 1990 [JP] Japan ................. 2-287562

[51] Int. Cl.⁵ ............. H04N 1/23; B41J 11/66; B41F 13/56; B26D 5/00
[52] U.S. Cl. ............. 358/304; 346/24; 400/621; 355/310; 101/224; 83/360
[58] Field of Search ............. 358/304; 346/24; 355/310, 311; 400/621; 101/224, 226, 227; 83/360, 361, 364, 365

[56] References Cited

U.S. PATENT DOCUMENTS

| | | | |
|---|---|---|---|
| 3,614,306 | 10/1971 | Goldberg et al. | 358/304 |
| 4,122,497 | 10/1978 | Suzuki et al. | 358/304 |
| 4,164,762 | 8/1979 | Fukuoka et al. | 358/304 |
| 4,362,076 | 12/1982 | Sasaki et al. | 355/210 X |
| 4,456,366 | 6/1984 | Komiya et al. | 355/210 |
| 4,619,538 | 10/1986 | Patterson | 400/621 |
| 4,634,262 | 1/1987 | Imaizumi et al. | 355/210 |
| 4,810,110 | 3/1989 | Myers | 400/621 X |
| 5,066,152 | 11/1991 | Kuzuya et al. | 400/621 |
| 5,073,801 | 12/1991 | Haneda et al. | 355/311 |

*Primary Examiner*—Benjamin R. Fuller
*Assistant Examiner*—Eric Frahm
*Attorney, Agent, or Firm*—Fitzpatrick, Cella, Harper & Scinto

[57] ABSTRACT

A cutting device includes a mechanism for receiving and cutting a sheet member between two blades, a motor for driving the mechanism, and a mechanism for detecting the operational state of the cutting mechanism. If the cutting operation cannot be completed within a preset time period, the motor is driven with a higher torque.

7 Claims, 3 Drawing Sheets

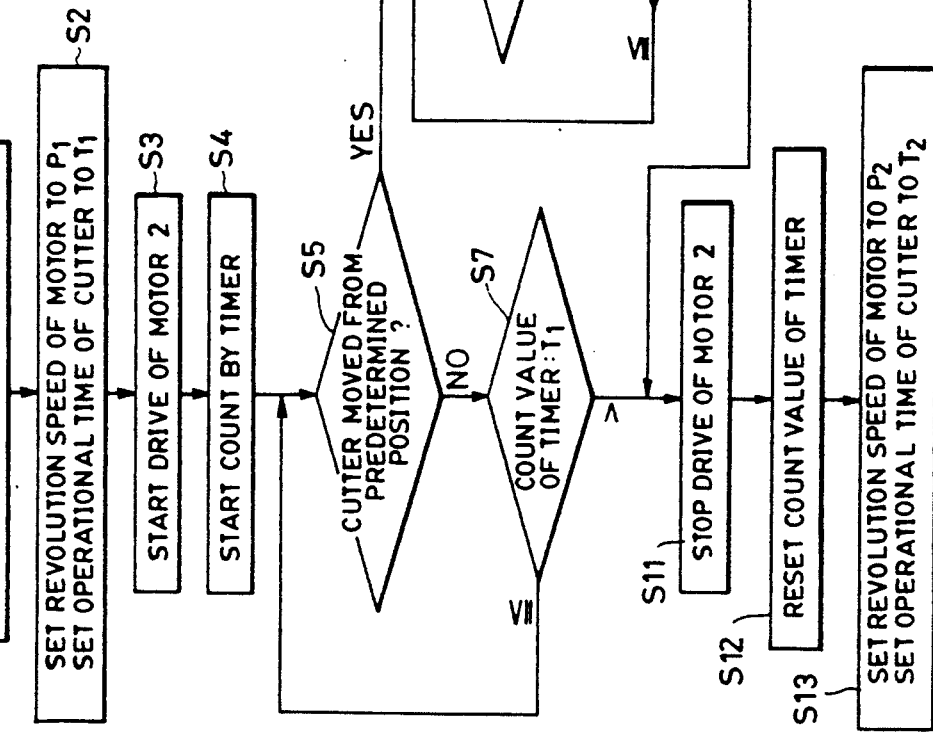

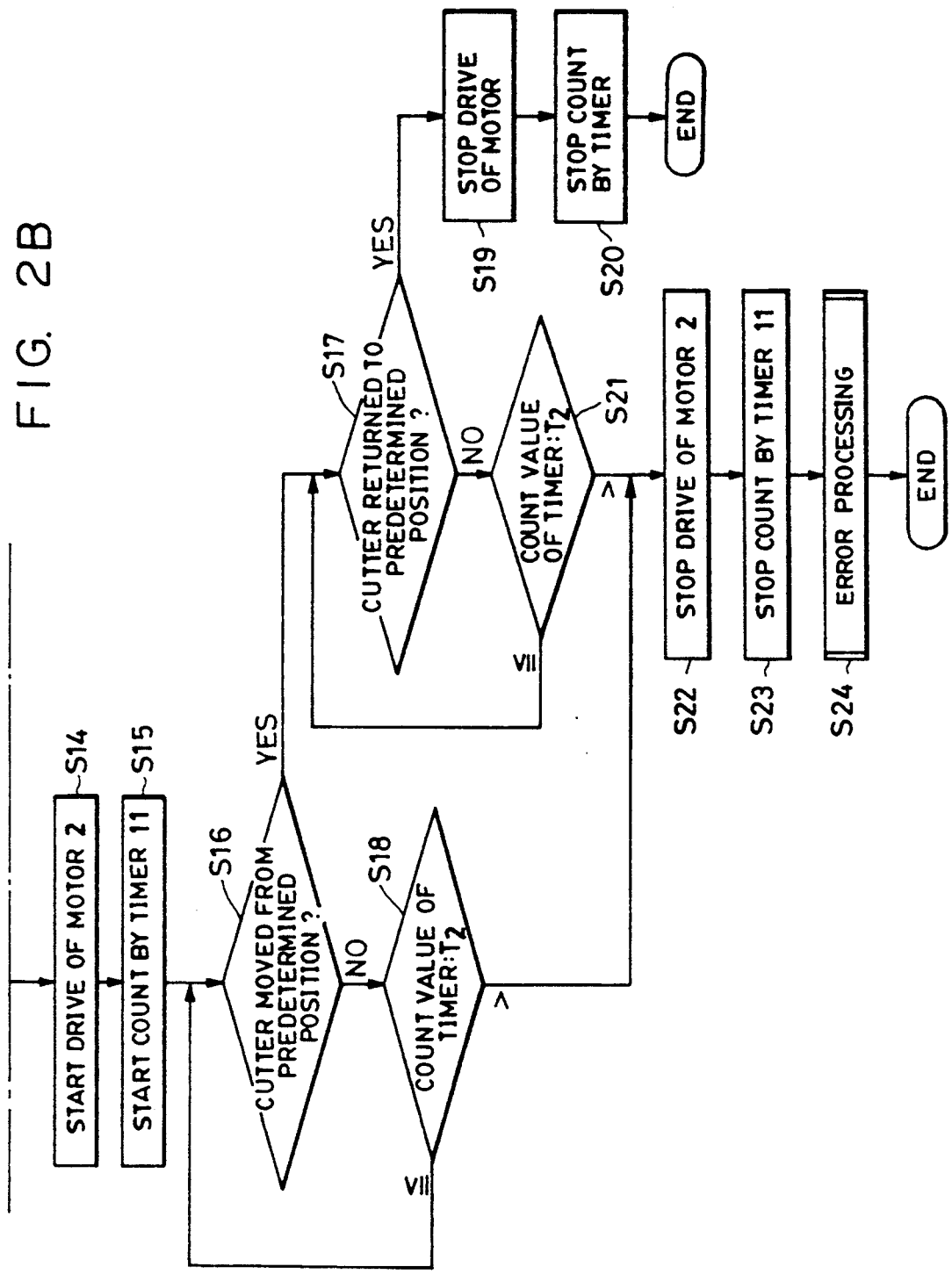

AUTOMATICALLY ADJUSTABLE SHEET MEMBER CUTTING DEVICE

This application is a continuation of application Ser. No. 07/781,573 filed Oct. 23, 1991, now abandoned.

BACKGROUND OF THE INVENTION

1. Field of the Invention

This invention relates to a sheet member cutting device used, for example, in a facsimile machine.

2. Description of the Prior Art

A conventional sheet member cutting device cuts recording paper by receiving the lead end of rolled recording paper between two cutter blades and then driving the cutter blades, as shown, for example, in U.S. Pat. No. 4,768,100.

A cutting device of this kind interrupts the cutting operation when it detects that the cutting operation by the cutter blades has not been completed within a predetermined time period, and thereafter the cutting operation is not performed unless the abnormal state causing the delay is released in some manner.

Such an approach is disadvantageous when the device is used in an apparatus that normally operates in an unmanned state, such as a facsimile apparatus.

When a facsimile apparatus is used in an office which communicates by facsimile with an office located in a substantially different time zone, the information exchange will often take place when one office (i.e., the receiving office) is unmanned. For example, information exchange between overseas locations is frequently performed so that the reception of facsimile information will concenterate, for example, between 7 o'clock in the evening and 8 o'clock the next morning during which time the office is unmanned. In such a case, if the above-described abnormal state occurs, for example, all facsimile information to be received cannot be received until an employee comes to the office and confirms the operational state of the facsimile apparatus, and releases the abnormal state.

SUMMARY OF THE INVENTION

It is an object of the present invention to overcome the above-described problems of the prior art.

It is another object of the present invention to automatically release an abnormal state of the cutting operation of a cutter.

It is still another object of the present invention to redrive a cutting device by setting the driving torque of the device to a high value when the cutting operation of the cutting device cannot be completed within a predetermined time period.

In one aspect, there is provided a sheet member cutting device with a cutter having blades at least one of which is movable between a first position for receiving a sheet member and a second position for cutting a sheet member. A driving means moves the blade from one of the first and second positions to the other at a plurality of driving speeds and a timer measures a time after the blade movement caused by the driving means has started. There is also a memory for storing a plurality of times, each corresponding to a time necessary for normally completing a cutting operation by the cutter at one of the plurality of driving speeds for the driving means. A control means starts the drive of the driving means at a first driving speed, compares a time stored in the memory corresponding to the first speed with a time measured by the timer, and sets the driving speed of the driving means to a driving speed wherein the time measured by the timer will be greater than the time stored in memory corresponding to the first speed.

In another aspect there is provided a sheet member cutting device comprising a cutter having blades at least one of which is movable between a first position for receiving a sheet member and a second position for cutting a sheet member, and driving means for moving the blade from one of the first and second positions to the other, the driving means moving the blade at a plurality of driving speeds. There are also detection means for detecting whether the blade is at the first position, a timer for measuring a time after the blade movement caused by the driving means has started, a memory for storing a plurality of times, each corresponding to a time necessary for normally completing a cutting operation by the cutter at one of the plurality of driving speeds for the driving means, and control means. The control means is for starting the drive of the driving means at a first driving speed, for comparing a time stored in the memory corresponding to the first speed with a time measured by the timer, and for setting a time measured by the timer, and for setting the driving speed of the driving means to a driving speed wherein the time measured by the timer will be greater than the time stored in memory corresponding to the first speed, the control means stopping the drive of the driving means when the detection means detects that the blade of the cutter has not been at the first position and thereafter detects that the blade of the cutter has returned to the first position.

In yet another aspect, there is provided a sheet member cutting device for a facsimile apparatus comprising first driving means for feeding a sheet member, a cutter having cutting means pisitionable at a first state for receiving the sheet member into the cutter and a second state wherein the sheet member received by the cutter has been cut by driving the cutter from the first state to the second state, and second driving means for driving the cutter means at a plurality of speeds from one of the first and second states to the other, driving torques in at least two of the speeds being set for the second driving means. There is also provided a timer for measuring a time after the drive of the driving means has been started, a memory for storing a plurality of times, each corresponding to a time necessary for normally completing a cutting operation by the cutter at one of the driving torques in the at least two of the speeds for the second driving means, and control means. The control means is for starting the drive of the driving means with a driving torque from a first speed after the drive of the first driving means has been stopped, for comparing a time stored in the memory corresponding to the first speed with a time measured by the timer, and for setting the driving torque for the second driving means at a higher driving torque when the time measured by the timer becomes greater than the time stored in memory corresponding to the first speed.

These and other objects and features of the present invention will become more apparent from the following detailed description of the preferred embodiment.

BRIEF DESCRIPTION OF THE DRAWINGS

FIG. 2 consists of FIGS. 2A and 2B together are a flowchart for the circuitry shown in FIG. 1.

DETAILED DESCRIPTION OF THE PREFERRED EMBODIMENT

Figure 1:
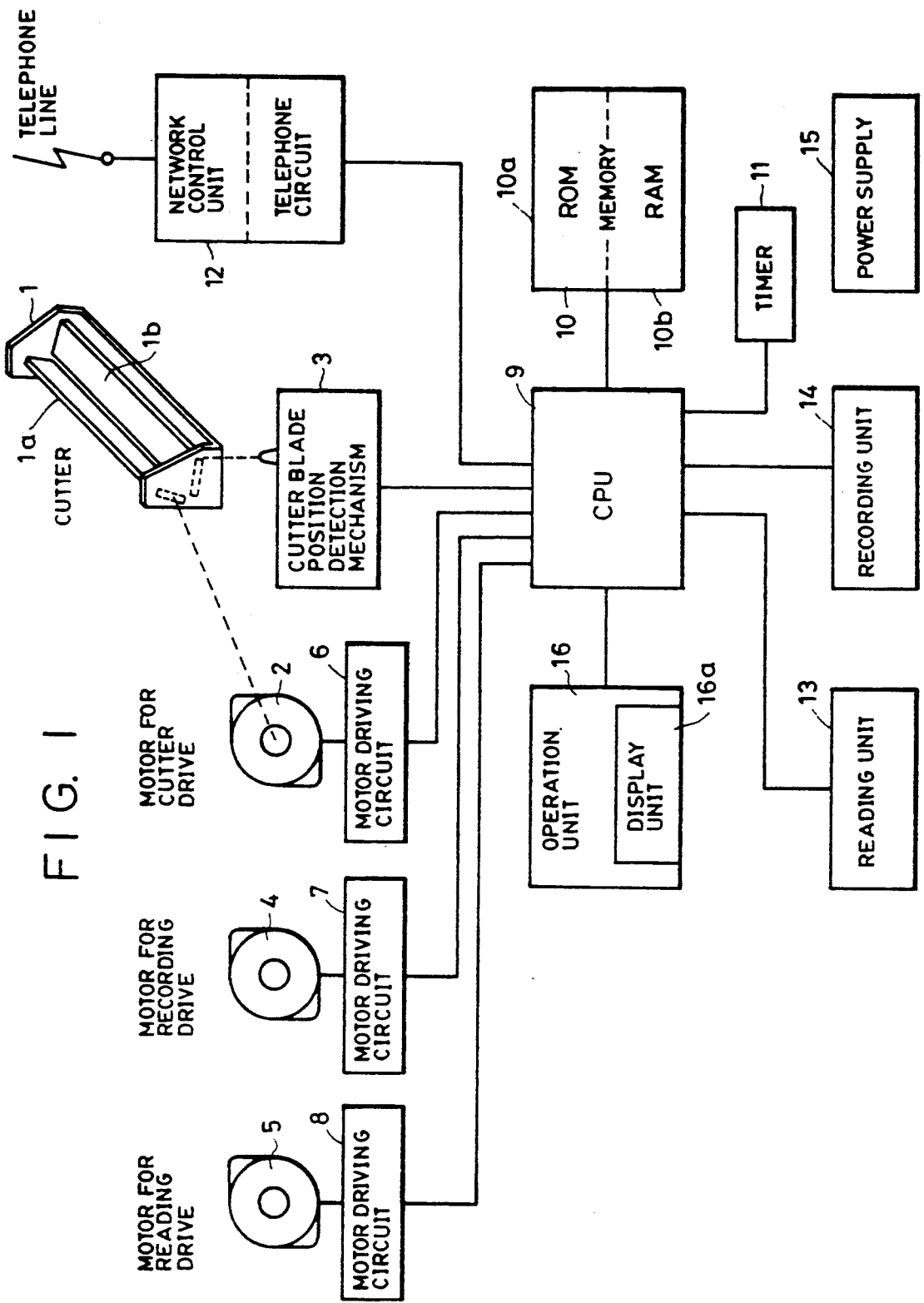
FIG. 1 is a block diagram showing electric circuitry of a device according to an embodiment of the present invention.

The preferred embodiment of the present invention will now be explained with reference to the drawings.

FIG. 1 shows an electrical block diagram of the entire cutting device. In FIG. 1, a cutter 1 for cutting rolled recording paper (not shown) cuts the recording paper while receiving the paper between two cutter blades 1a and 1b. The cutting operation is performed by the drive of a motor 2 for cutter drive. A position detection mechanism 3 for the cutter blades 1a and 1b detects whether the cutter blades 1a and 1b are at a position for receiving recording paper therebetween, or in a cutting operation of the recording paper. A motor 4 for recording drive feeds recording paper. A motor 5 for reading drive feeds an original.

Among the above-described motors 2, 4 and 5, at least the motor 2 for cutter drive is a stepping motor. The motors 2, 4 and 5 are controlled by a CPU 9 using driving pulses issued from motor driving circuits 6, 7 and 8, respectively, so that the speeds of the motors 2, 4 and 5 can be changed. A memory 10 includes a ROM 10a and a RAM 10b. The ROM 10a primarily stores programs for control by CPU 9 and stores constants. The RAM 10b primarily stores variables, printing information and the like. In either ROM 10a or RAM 10b of the memory 10 there is stored time $T_1$ or $T_2$, which are necessary and sufficient for normally completing a cutting operation of recording paper in accordance with a revolution speed $P_1$ or $P_2$ of the motor 2 for cutter drive, respectively. The time $T_1$ or $T_2$, as appropriate, is compared with a time counted by a timer 11. The timer 11 counts time from when the drive of the motor 2 for cutter drive is started. A telephone line is connected to the CPU 9 via a network control unit/telephone circuit 12. A reading unit 13 and a recording unit 14 are also connected to the CPU 9. There is also shown a power supply 15. An operation unit 16 is provided with a display unit 16a, and includes ten keys for operation of the telephone and keys for instructing the start and interruption of the operation of a fascimile apparatus. The display unit 16a comprises an LED (light-emitting diode), an LCD (liquid-crystal display) or the like, and displays, for example, that the cutter 1 cannot return to a normal state due causing error processing.

The operation of the device having the above-described configuration will now be explained with reference to the flowchart shown in FIG. 2.

When recording is completed and the drive of the motor 4 for recording drive is stopped by the motor driving circuit 7 according to a command from the CPU 9, the count value of the timer 11 is simultaneously reset to zero in step $S_1$. In step $S_2$, the motor 2 for cutter drive is set to a rotation speed $P_1$ via the motor driving circuit 6, and the operational time of the cutter 1 is set to $T_1$. In step $S_3$, the drive of the motor 2 for cutter driving is started. In step $S_4$, the counting operation of the timer 11 is started. Steps $S_3$ and $S_4$ begin simultaneously. When the motor 2 for cutter driving is rotated at speed $P_1$, the cutter blades 1a and 1b of the cutter 1 operate, and the cutter blade position detection mechanism 3 detects the position of the cutter blades 1a and 1b. That is, in step $S_5$, the CPU 9 determines whether or not the cutter 1 has moved from a predetermined position for receiving the recording paper. If the result of the determination is affirmative, the process proceeds to step $S_6$. If the result of the determination is negative, the process proceeds to step $S_7$. In step $S_6$, the CPU 9 determines using the position detection mechanism 3 whether or not the cutter 1 has returned to its original position. If the result of the determination is affirmative, the drive of the motor 2 is stopped in step $S_8$, and the counting operation of the timer 11 is stopped in step $S_9$ to terminate the operation. If the result of the determination in step $S_5$ or step $S_6$ is negative, the process proceeds to step $S_7$ or step $S_{10}$, respectively. In steps $S_7$ and $S_{10}$, the CPU 9 compares the count value of the timer 11 at that time with the time $T_1$ read from the memory 10. If the count value of timer 11 is $\leq T_1$, the process returns to steps $S_5$ and $S_6$, respectively. If the count value of timer 11 is greater than $T_1$, the process in each case proceeds to step $S_{11}$, where the revolution of the motor 2 is stopped. In step $S_{12}$, the count value of the timer 11 is reset. In step $S_{13}$, the motor 2 for cutter drive is reset to a rotation speed $P_2$ via the motor driving circuit 6, and the operational time of the cutter 1 is reset to $T_2$. In step $S_{14}$, the drive of the motor 2 is started. In step $S_{15}$, the counting operation of the timer 11 is started. Step $S_{14}$ and step $S_{15}$ occur simultaneously. When the motor 2 is rotated with the speed $P_2$, the cutter blades 1a and 1b of the cutter 1 operate, and the cutter blade position detection mechanism 3 detects the state of the cutter blades 1a and 1b. That is, in step $S_{16}$, the CPU 9 determines whether or not the cutter 1 has moved from the predetermined position for receiving the recording paper. If the result of the determination is affirmative, the process proceeds to step $S_{17}$. If the result of the determination is negative, the process proceeds to step $S_{18}$. In step $S_{17}$, the CPU 9 determines using the position detection mechanism 3 whether or not the cutter 1 has returned to its original position. If the result of the determination is affirmative, the drive of the motor 2 is stopped in step $S_{19}$, and the counting operation of the timer 11 is stopped in step $S_{20}$ to terminate the operation. If the result of the determination in step $S_{17}$ is negative, the process proceeds to step $S_{21}$. In steps $S_{18}$ and $S_{21}$, the CPU 9 compares the count value of the timer 11 with the time $T_2$ read from the memory 10. If the count value of timer 11 is less than or equal to $T_2$, the process returns to steps $S_{16}$ and $S_{17}$, respectively. If the count value of timer 11 is greater than $T_2$, the process proceeds to step $S_{22}$, where the drive of the motor 2 is stopped. In step $S_{23}$, the counting operation of the timer 11 is stopped. In step $S_{24}$, error processing is performed so that the display unit 16a identifies the error in its display, and the operation is terminated.

An explanation will now be provided of the reason why the revolution speed of the motor 2 for recording drive is switched between $P_1$ and $P_2$, and the operational time of the cutter 1 is switched between $T_1$ and $T_2$. That is, the phenomenon that the cutting operation is not completed within a predetermined time period (an abnormal state of the cutting mechanism) is often caused by the erroneous receipt of a plurality of sheets of a sheet material into the cutting portion at the same time. The cutting mechanism is driven with the torque necessary and sufficient for cutting a single sheet of the sheet material. This is because the cost of a driving source increases as the torque increases and because the cutting time is preferably as short as possible in order to minimize the conversation tariff of a facsimile. The driving torque for the stepping motor is reduced as the motor is driven at a higher speed.

Accordingly, the stepping motor is driven at a marginal highest speed so as to be capable of generating a torque with which a single sheet of recording paper can be cut. When an abnormal state occurs, recovery from the abnormal state is an item having the highest priority.

When a plurality of sheets of recording paper are received in the cutting portion, a greater driving force than when cutting a single sheet is needed for cutting the plurality of sheets. Hence, by rotating the stepping motor, serving as the driving force, at a lower speed than the usual speed, a larger driving torque is obtained. The plurality of sheets are forcibly cut using the larger driving torque, and the cutting function is thereby recovered.

For that purpose, when the cutter 1 is driven, the timer 11 simultaneously starts counting the time that has lapsed after the cutter 1 has been driven. If the lapsed time exceeds a predetermined time for comparison, the CPU 9 determines that a malfunction has occurred during the cutting operation of the cutter 1, and reduces the number of revolutions per unit time of the stepping motor, serving as the driving source, to less than normal rotation speed by reducing the pulse rate. If, for example, the number of revolutions per unit time used in the normal cutting operation is 500 pps (pulses per second), the number of revolutions will be reduced to about 200 to 300 pps. It is thereby possible to increase the driving torque which the driving source generates in normal operation. Since the relationship between the driving torque and the number of revolutions per unit time is not liner, the number of revolutions per unit time for obtaining the correct driving torque is set using the result of an experiment. The driving torque as a reference at that setting may have a value necessary and sufficient for simultaneously cutting two sheets of recording paper.

Most cases where a plurality of sheets of recording paper are received in the cutting portion involved the receipt of two sheets. Accordingly, a torque sufficient for cutting two sheets will be provided if the torque has a value about twice the torque required for cutting a single sheet of recording paper.

However, when the position detection mechanism does not detect the return of the cutter blades to a predetermined position within a predetermined time period (different from the above-described time period) even if the stepping motor is driven at a reduced number of revolutions per unit time as described above, the cutter blades may be driven again by further reducing the number of revolutions per unit time. In this case, a revolution speed $P_3$ and a time $T_3$ are also stored in the memory 10.

Although, in the above-described embodiment, the motor for cutter drive functions independently, the motor may be used together with the motor for reading drive or the motor for recording drive. Furthermore, a conventional DC motor may be used in place of the stepping motor. In this case, the revolution speed of the motor is changed by switching the current value of the driving circuit for the motor in place of changing the pulse rate.

Although, in the above-described embodiment, the drive of the motor is stopped in step $S_{11}$, the revolution speed may be set to $P_2$ without stopping the drive of the motor. In this case, steps $S_{11}$ and $S_{14}$ are unnecessary.

As explained above, by driving the stepping motor with a slower speed to complete the cutting operation if the cutter blades do not return to a predetermined position within a predetermined time period, the operation can be continued without causing error processing even in a state wherein the operation is stopped with causing error processing in the conventional approach. Hence, the present invention has the effect of greatly reducing the probability of not receiving important information.

While the present invention has been described with respect to what is presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A sheet member cutting device comprising:
   a cutter having blades at least one of which is movable between a first position for receiving a sheet member and a second position for cutting a sheet member;
   a stepping motor for moving said blade from one of the first position and the second position, said stepping motor moving said blade at a plurality of rotation speeds;
   a timer for measuring a time after the blade movement caused by said stepping motor has started;
   a memory for storing a plurality of times, each corresponding to a time necessary for normally completing a cutting operation by said cutter at one of said plurality of rotation speeds for said stepping motor; and
   control means for starting a drive of said stepping motor at one of said plurality of rotation speeds, for comparing a time stored in the memory corresponding to the one of said plurality of rotation speeds with a time measured by a timer, and for setting the rotation speed of said stepping motor to another one of said plurality of rotation speeds wherein the time measured by the timer will be greater than the time stored in memory corresponding to the one of said plurality of rotation speeds, and said control means comprises a malfunction detection means for detecting a malfunction in the cutting of the sheets member and for correcting the malfunction by setting the rotation speed to another one of the plurality of rotation speeds whereby a driving torque of the stepping motor is increased or by setting the driving torque at a higher driving torque.

2. A device according to claim 1, wherein the plurality of times stored in memory are set so that the rotation speed corresponding to a first time is fastest, the rotation speed decreases with each subsequent time stored in memory, and wherein the torque of the stepping motor is set so as to increase with each subsequent time stored in memory.

3. A sheet member cutting device comprising:
   a cutter having blades at least one of which is movable between a first position for receiving a sheet member and a second position for cutting a sheet member;
   a stepping motor for moving said blade from one of the first position and the second position, said stepping motor moving said blade at a plurality of rotation speeds;
   detection means for detecting whether said blade is at the first position;
   a timer for measuring a time after the blade movement caused by said stepping motor has started;

a memory for storing a plurality of times, each corresponding to a time necessary for normally completing a cutting operation by said cutter at one of said plurality of rotation speeds for said stepping motor; and control means for starting a drive of said stepping motor at one of said plurality of rotation speeds, for comparing a time stored in the memory corresponding to the one of said plurality of rotation speeds with a time measured by the timer, and for setting a rotation speed of said stepping motor to another one of said plurality of rotation speeds wherein the time measured by a timer will be greater than the time stored in memory corresponding to the one of said plurality of rotation speeds, and said control means comprises a malfunction detection means for detecting a malfunction in the cutting of the sheets and for correcting the malfunction by setting the rotation speed to another one of the plurality of rotation speeds whereby the driving torque of the stepping motor is increased or by setting the driving torque at a higher driving torque, said control means stopping the drive of said stepping motor when said detection means detects that the blade of said cutter is not at the first position and thereafter detects that the blade of said cutter has returned to the first position.

4. A sheet member cutting device for a facsimile apparatus, comprising:

a driving means for feeding a sheet member;

a cutter having cutting means positionable at a first state for receiving the sheet member into the cutter and at a second state wherein the sheet member received by the cutter has been cut by driving said cutter from the first state to the second state;

a stepping motor for driving said cutter means at a plurality of speeds from one of the first state and the second state, driving torques in at least two of said speeds being set for said stepping motor;

a timer for measuring a time after a drive of said stepping motor has been started;

a memory for storing a plurality of times, each corresponding to a time necessary for normally completing a cutting operation by said cutter at one of said driving torques in the at least two of said speeds for said stepping motor; and control means for starting the drive of said stepping motor with a driving torque from a first speed after the drive of said driving means has been stopped, for comparing a time stored in the memory corresponding to a first speed with a time measured by the timer, and for setting the driving torque for said stepping motor at a higher driving torque when the time measured by the timer becomes greater than the time stored in memory corresponding to the first speed, said control means comprising a malfunction detection means for detecting a malfunction in the cutting of the sheet member and for correcting the malfunction by setting the driving torque at a higher driving torque.

5. A device according to claim 4, wherein said control means sets said stepping motor to the driving torque from the first speed after the drive of said driving means has stopped, sets the timer to an initial value, and sets the memory to the time in the first speed.

6. A device according to claim 5, wherein said control means compares the time corresponding to the first speed set in the memory with the time measured by the timer, sets the driving torque for said stepping motor to the next higher driving torque when the time measured by the timer becomes greater than the time corresponding to the first speed set in memory, sets the timer to the initial value, and sets the memory to the time corresponding to the first speed.

7. A device according to claim 6, further comprising:

a display unit for displaying that the cutting operation by said cutter is not normally completed, and wherein said control means compares a time corresponding to the next lower speed in the memory with the time measured by the timer, and stops the drive of said stepping motor and performs error display on the display unit when the time measured by the timer is greater than the time corresponding to the next lower speed.

* * * * *

UNITED STATES PATENT AND TRADEMARK OFFICE
CERTIFICATE OF CORRECTION

PATENT NO. : 5,315,398
DATED : May 24, 1994
INVENTOR(S) : SHINNICHIRO OTSUKI

It is certified that error appears in the above-indentified patent and that said Letters Patent is hereby corrected as shown below:

On the title page, item [75], "Kawaskai" should read --Kawasaki--.

<u>Column 1</u>,
    line 34, "concenterate," should read --concentrate,--.

<u>Column 2</u>,
    line 36, "pisitionable" should read --positionable--.

<u>Column 5</u>,
    line 31, "liner," should read --linear,--.

<u>Column 6</u>,
    line 43, "sheets" should read --sheet--.

<u>Column 7</u>,
    line 13, "a" should read --the--;
    line 18, "sheets" should read --sheet member--; and
    line 22, "the" (first occurrence) should read --a--.

<u>Column 8</u>,
    line 22, "said" should read --said first--.

Signed and Sealed this

Twenty-seventh Day of December, 1994

Attest:

BRUCE LEHMAN

*Attesting Officer*    *Commissioner of Patents and Trademarks*